United States Patent
Gokhale et al.

(10) Patent No.: US 7,661,751 B2
(45) Date of Patent: Feb. 16, 2010

(54) COLLAPSIBLE ARMREST SYSTEM WITH PULL CUP

(75) Inventors: Vikram Gokhale, Farmington Hills, MI (US); John Pinkerton, Canton, MI (US); Krish Aekbote, Farmington Hills, MI (US); Glen Ursaki, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 11/409,797

(22) Filed: Apr. 24, 2006

(65) Prior Publication Data

US 2007/0246968 A1    Oct. 25, 2007

(51) Int. Cl.
*B60J 5/04*    (2006.01)
*B60R 21/02*    (2006.01)

(52) U.S. Cl. ............. 296/153; 296/187.05; 296/187.12; 296/1.09

(58) Field of Classification Search ................. 296/153, 296/1.02, 1.09, 146.7, 187.12, 187.05
See application file for complete search history.

(56) References Cited

U.S. PATENT DOCUMENTS

| | | | |
|---|---|---|---|
| 6,409,249 B1 * | 6/2002 | Han ........................ | 296/146.7 |
| 6,983,967 B2 * | 1/2006 | Scheidmantal et al. ..... | 296/1.09 |
| 7,222,910 B1 * | 5/2007 | Doan et al. ................. | 296/153 |
| 7,234,209 B2 * | 6/2007 | Totani et al. ................ | 24/607 |
| 7,240,957 B2 * | 7/2007 | Dry et al. .................... | 296/153 |
| 7,347,470 B2 * | 3/2008 | Steelman ................... | 296/1.09 |
| 7,387,326 B2 * | 6/2008 | Osada ....................... | 296/39.1 |

FOREIGN PATENT DOCUMENTS

| | | | | |
|---|---|---|---|---|
| JP | 404260816 | * | 2/1991 | ................. 296/153 |
| JP | 405065023 | * | 3/1993 | ................. 296/153 |

* cited by examiner

*Primary Examiner*—Glenn Dayoan
*Assistant Examiner*—Gregory Blankenship
(74) *Attorney, Agent, or Firm*—Shok, Hardy & Bacon LLP

(57) ABSTRACT

A pull cup in a vehicle door is solidly connected to the door inner panel by mechanical fastening. The armrest substrate structure is also solidly connected to the door inner panel by mechanical fastening. The armrest substrate has a pull cup-receiving cavity formed therein as is generally known in the art. The pull cup is not mechanically fastened to the armrest substrate. This arrangement is strong in tension but is weak in compression.

15 Claims, 5 Drawing Sheets

COLLAPSIBLE ARMREST SYSTEM WITH PULL CUP

TECHNICAL FIELD

The present invention relates generally to a pull cup of an armrest for use with a vehicle. More specifically, the present invention relates to a collapsible armrest system having a pull cup that is positively connected to the vehicle door inner panel but not to the armrest substrate structure, providing an arrangement that is strong in tension but is weak in compression.

BACKGROUND OF THE INVENTION

It is known in vehicles to provide an armrest in a door having an integrated pull cup to allow the occupant to pull the door shut. According to the known arrangement, the pull cup, typically composed of a molded plastic, is anchored to the vehicle door inner panel by a variety of fasteners and, in some arrangements, by snap-fittings as well. In addition to being anchored to the vehicle door inner panel, the pull cup is also solidly connected to the armrest substrate, also by either mechanical fasteners, snap-fittings, or both.

The known approach to anchoring the pull cup to both the vehicle door inner panel as well as the armrest substrate provides a good degree of lateral door function to the vehicle occupant while opening and, particularly, closing the door. However, as in so many areas of vehicle technology, there is room in the art of vehicle interior door design for providing an alternative configuration which will strengthen door pull cup and armrest design overall without compromising lateral door function.

SUMMARY OF THE INVENTION

The present invention provides an alternative arrangement to known vehicle door pull cup and armrest designs. According to the present invention, the load transferred to the occupant is reduced by an arrangement whereby the force applied against the armrest cover and armrest substrate is transferred directly to the inner panel of the door, thus bypassing the pull cup. This outcome may be achieved without compromising lateral door function. The alternative arrangement of the present invention thus provides a design that is strong in tension but is weak in compression.

According to the present design, the pull cup is solidly connected to the door inner panel by mechanical fastening. The armrest substrate structure is also solidly connected to the door inner panel by mechanical fastening. The armrest substrate structure has a pull cup-receiving cavity formed therein as is generally known in the art. The armrest substrate structure has a slot formed to each side of the pull cup-receiving cavity, the slots reducing resistance of the armrest substrate structure to the force applied by an occupant in an accident event. However, unlike the prior art, the pull cup is not mechanically fastened to the armrest substrate structure but effectively floats relative to the pull cup-receiving cavity.

Because the pull cup is snugly fitted within the pull cup-receiving cavity of the armrest substrate structure, the pull cup and the armrest substrate structure with its soft outer skin foam cover appear to form an integral unit, thus the appearance of the inner door assembly is not compromised. Nor does the arrangement of the present invention compromise structural integrity since effectiveness at the design in accommodating the load needed for door closing is maintained. Instead, the present invention effectively eliminates virtually entirely the pull cup from the matter of the occupant's force against the inner panel of the door by transferring the force directly from the armrest cover-armrest substrate structure directly to the inner door thus bypassing the pull cup. By transferring the load directly to the inner door, the arrangement acts in a manner similar to the operation of a modern vehicle bumper in an ordinary accident event in which the applied force is absorbed prior to reaching a relatively immovable structure of the vehicle.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
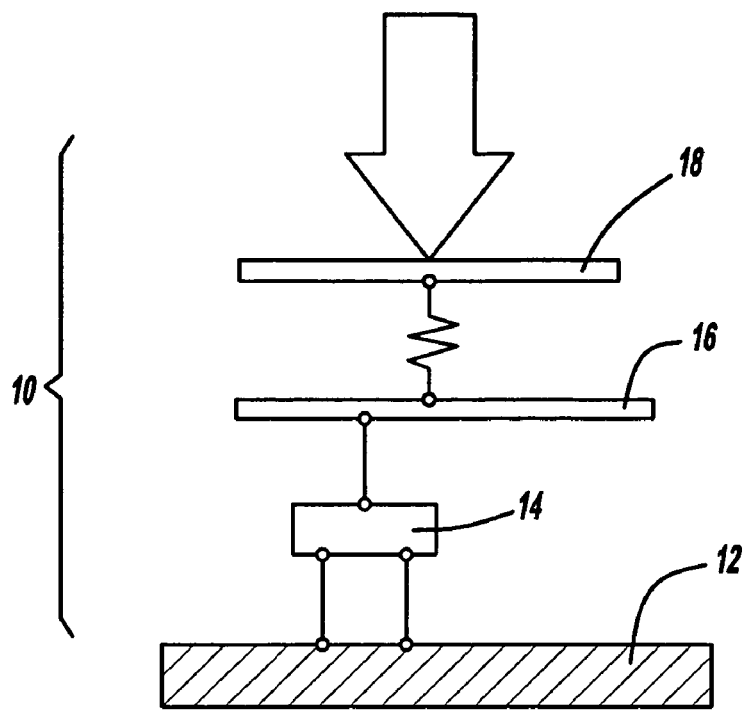
FIG. 1 shows a diagrammatic view that illustrates the structural relationship between the pull cup, the door inner panel and the armrest substrate according to the prior art.

In the following figures, the same reference numerals will be used to refer to the same components. In the following description, various operating parameters and components are described for one constructed embodiment. These specific parameters and components are included as examples and are not meant to be limiting.

FIG. 1 illustrates a diagrammatic view of the arrangement of the pull cup, the door inner panel, and the armrest substrate of the prior art. Particularly, a prior art arrangement of door sub-assembly, generally shown as 10, is set forth. The sub-assembly 10 includes a door inner panel 12 to which a pull cup 14 is directly attached via a solid connection such as by mechanical fastening. The door inner panel 12 is conventionally composed of sheet metal. An armrest substrate 16 is solidly connected to both the pull cup 14 and the door inner panel 12 also by mechanical fastening as is know in the art. The mechanical fastening described above may include conventional fasteners, a series of snap fittings, or both. A soft outer skin and foam cover 18 is attached to the armrest substrate 16.

According to the arrangement of the known door sub-assembly 10, in the event of an accident it is possible that the occupant adjacent the door may be forced against the door sub-assembly 10 as illustrated by the arrow which denotes impact energy. The hard attachment of the pull cup 14 to both the door inner panel 12 and the armrest substrate 16 provides a high degree of structural integrity but, in the event illustrated in FIG. 1 where impact energy is applied against the door sub-assembly 10, this same arrangement transfers forces to the occupant that may be higher than desired.

FIGS. 2 through 6 illustrate in various ways the alternative design of the present invention which provide an indirect path from the armrest to the door structure, bypassing the pull cup and reducing the forces transferred to the occupant.

Figure 2:
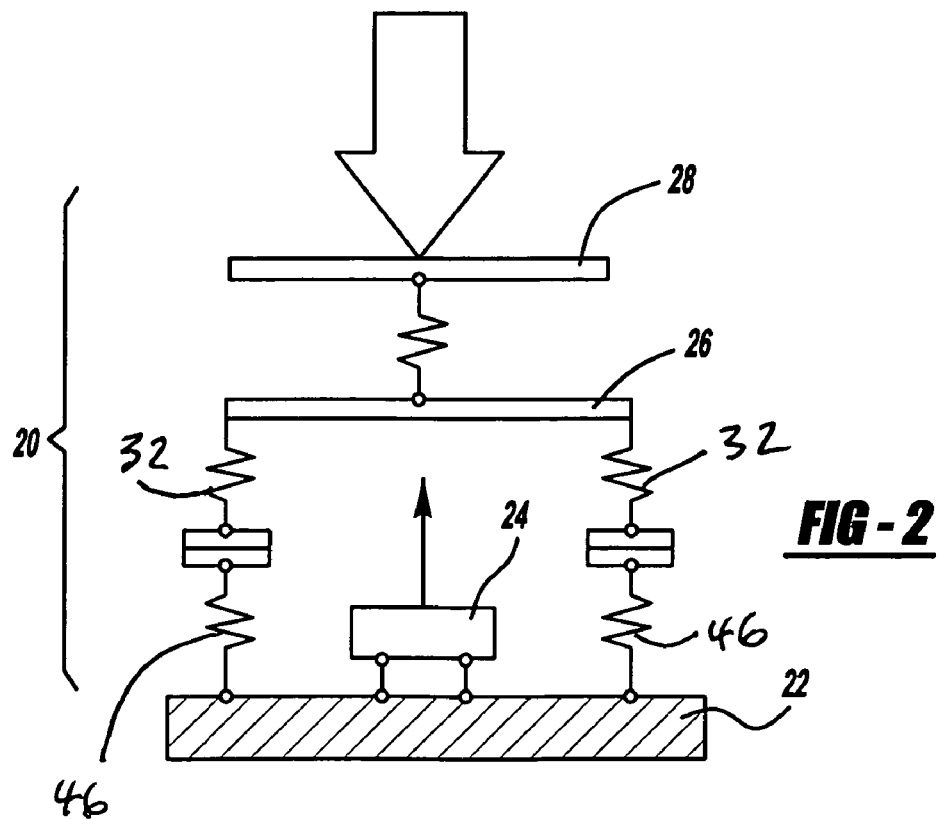
FIG. 2 shows a diagrammatic view that illustrates the structural relationship between the pull cup, the door inner panel and the armrest substrate according to the present invention.

Referring to FIG. 2, a door sub-assembly according to the present invention, generally illustrated as 20, is set forth. The door assembly 20 includes a door inner panel 22 formed from sheet metal. A pull cup 24 is positively attached directly to the door inner panel 22. An armrest substrate structure 26 is also attached directly to the door inner panel 22 but is not positively attached to the pull cup 24. A soft outer skin and foam cover 28 is attached directly to the armrest substrate structure 26.

According to the general arrangement of the present invention as shown in FIG. 2, the pull cup 24, positively attached as it is directly to the door inner panel 22, provides the occupant with the needed structure to accommodate the pull loads exerted on the pull cup 24 when the vehicle door is closed by the occupant. Conversely, in the event of an accident wherein the occupant impacts the inner side of the vehicle door, the pull cup 24, being physically disconnected from the generally surrounding armrest substrate structure 26, does not receive forces applied to the armrest substrate structure 26. Instead, these forces are transferred directly to the door inner panel 22. Accordingly, the design of the present invention manages or reduces forces transferred to the occupant.

FIGS. 3 through 6 provide structural detail as to the arrangement of the present invention.

Figure 3:
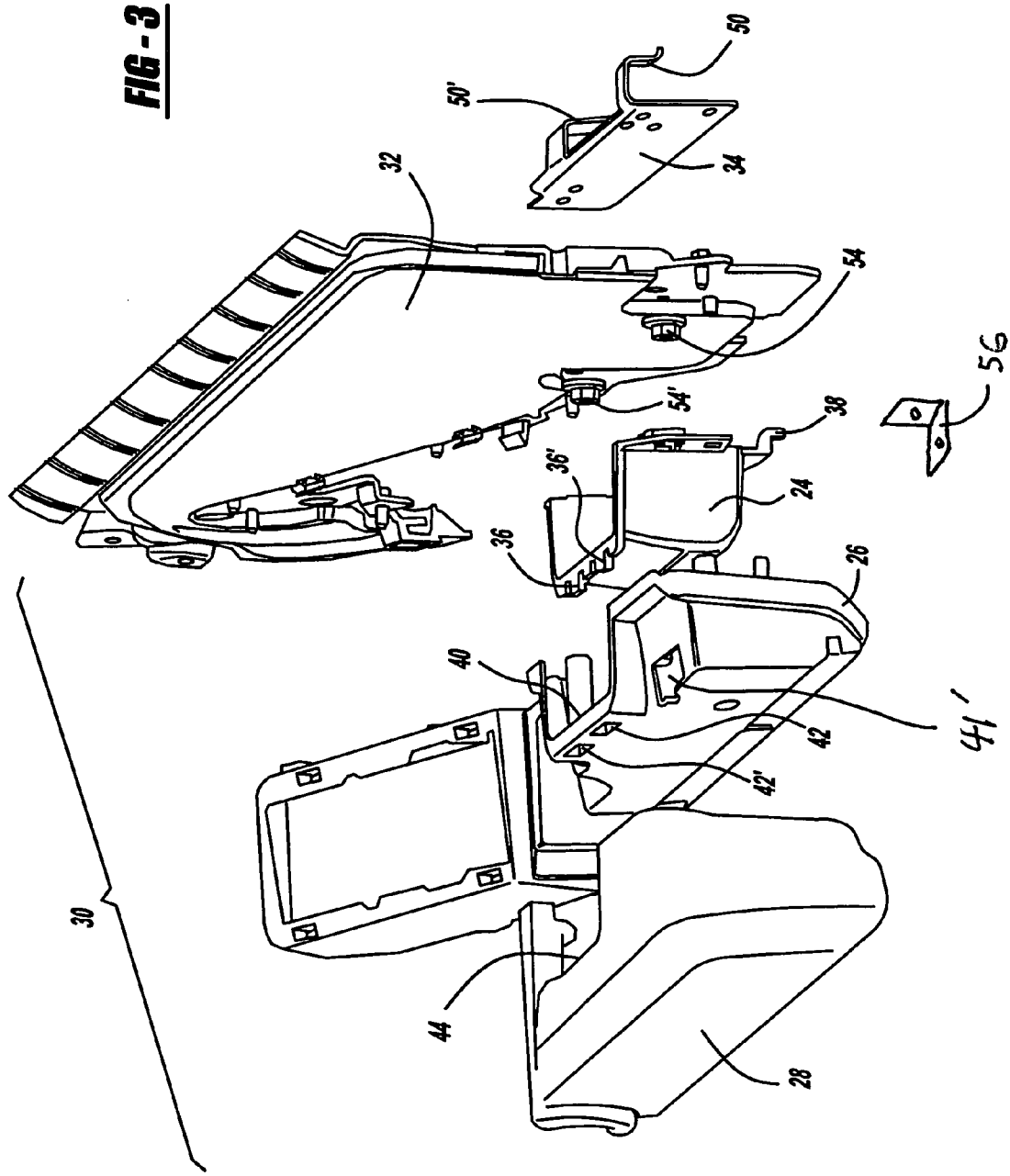
FIG. 3 illustrates an exploded view of the interior door assembly of the present invention and showing several of the principal components of the assembly.

Referring to FIG. 3, an exploded view of an interior door assembly according to the present invention is shown and is generally illustrated as 30. The interior door assembly 30 includes the pull cup 24, the armrest substrate structure 26, and the cover 28 of the door sub-assembly 20 shown diagrammatically in FIG. 2. The door assembly 30 also includes a door panel bolster 32 and a metal armrest bracket 34.

The pull cup 24, preferably composed of a polymerized material such as a plastic, includes a pair of spaced-apart armrest substrate alignment tabs 36, 36' on its front side and a pair of spaced-apart door panel bolster alignment tabs 38, 38' extending downwardly on its back side. (Only tab 38 can be seen in FIG. 3 although both tabs 38, 38' may be seen in FIG. 6.) Both armrest substrate alignment tabs 36, 36' and the door panel bolster alignment tabs 38, 38' are used primarily during assembly to allow for proper placement of the pull cup 24 relative to both the door panel bolster 32 and to the armrest substrate structure 26.

As illustrated and as is to be understood, the armrest substrate structure 26 is an essentially hollow structure. The armrest substrate structure 26 does have a pull cup-receiving aperture 40 defined in its top side. In addition, and as is most clearly shown in FIG. 4, a pair of slots 41, 41' are formed to the side of the pull cup-receiving aperture 40. The slots 41, 41' are provided for energy absorption in the event that force is applied to the armrest substrate structure 26.

Figure 4:
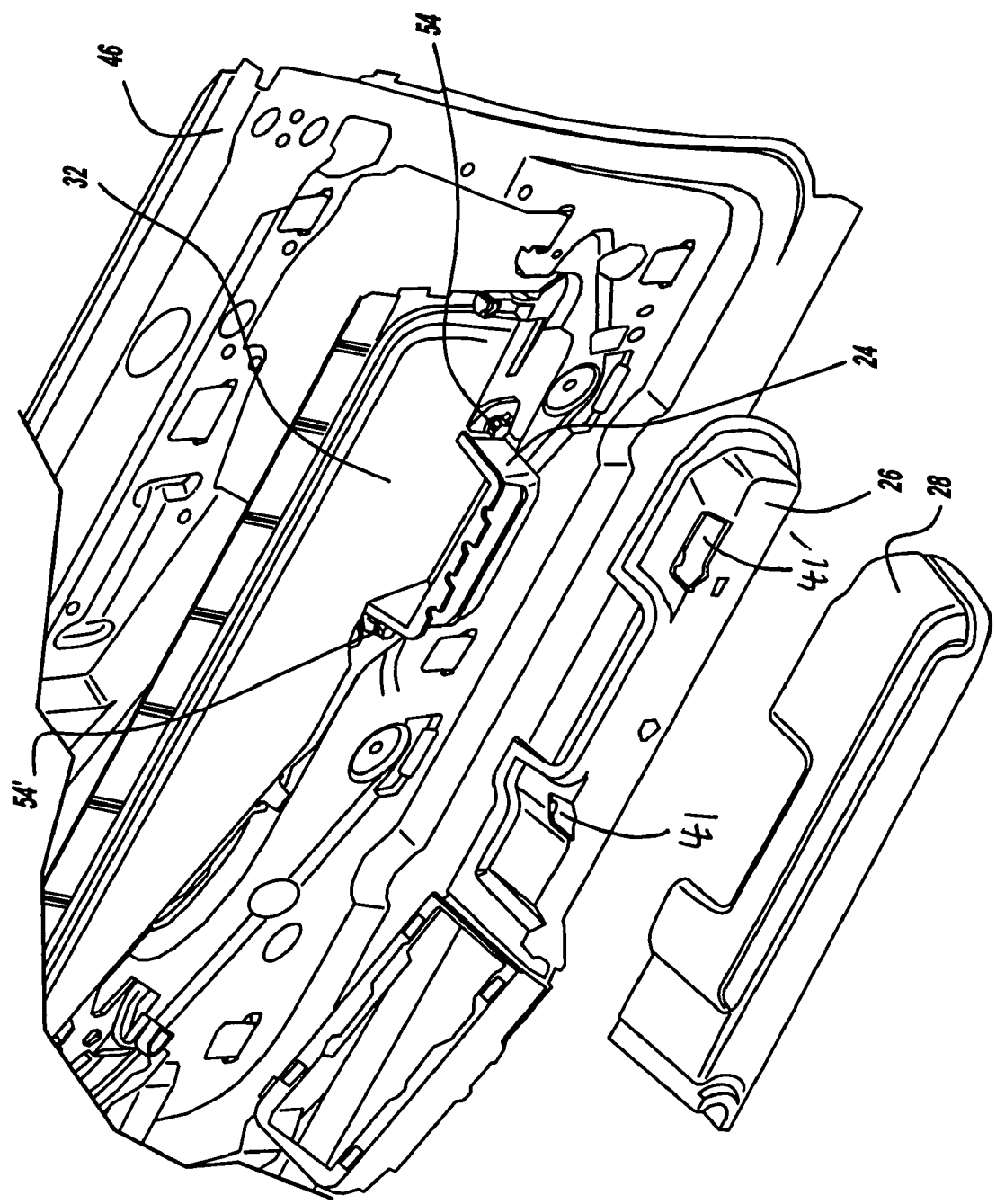
FIG. 4 illustrates a partially exploded view of some of the interior door assembly components of the present invention.
Figure 5:
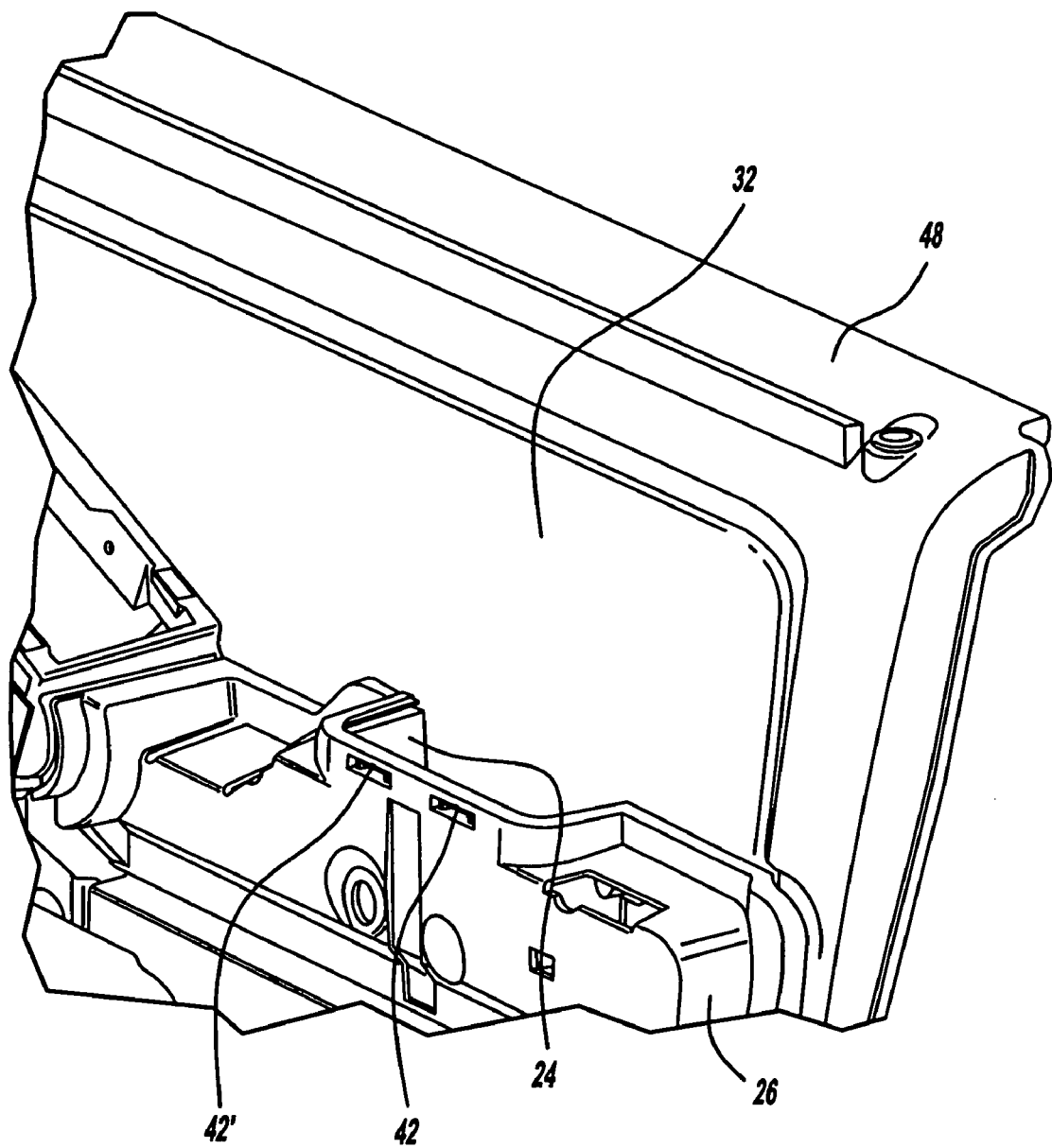
FIG. 5 illustrates a partial perspective view of the interior door assembly of the present invention specifically illustrating the assembled arrangement of the pull cup and the armrest substrate structure relative to the inner side of the vehicle door.
Figure 6:
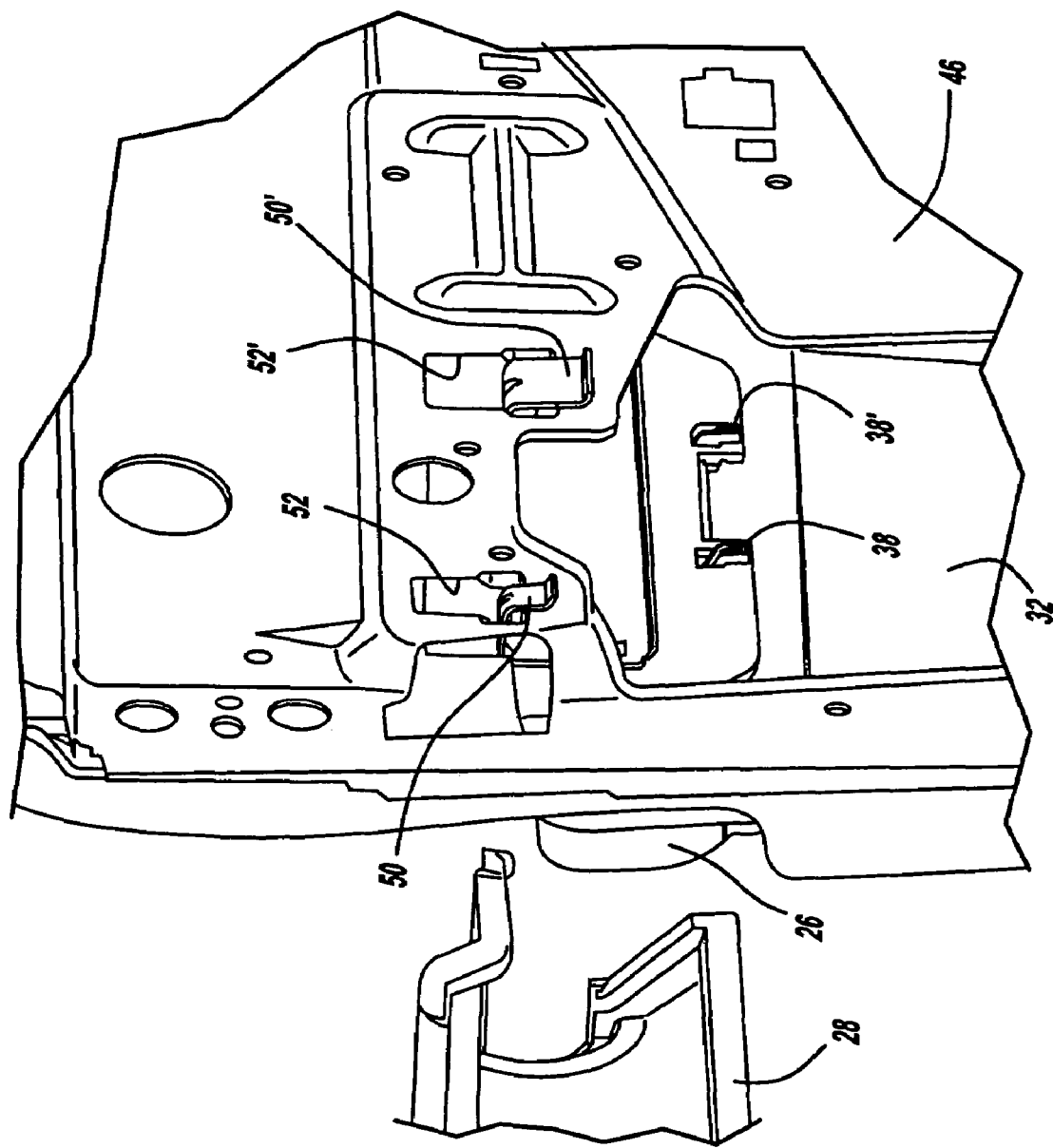
FIG. 6 illustrates a partial perspective and partially exploded view of the inner side of the inner panel sheet metal whereby the arrangement for connecting the armrest bracket to the inner panel sheet metal is clearly illustrated.

Referring generally to FIGS. 3 through 6, the pull cup-receiving aperture 40 has a front wall which as a pair of spaced apart slots 42, 42' defined therein. Once the pull cup 24 is attached to the inner panel as shown in FIGS. 4 and 6 and the armrest substrate structure 26 is attached to the inner panel as described below, the armrest substrate alignment tabs 36, 36' are positioned within their respective slots 42, 42' for alignment therewith. It is important to note that this alignment arrangement does not cause either a positive connection or fixed attachment of the pull cup 24 to the armrest substrate structure 26. Instead, other than the minimal interaction between the alignment tabs 36, 36' with the slots 42, 42', the pull cup 24 is generally disconnected from the armrest substrate structure 26. This arrangement is very adequate to allow easy assembly of the pull cup 24 and the armrest substrate structure 26 without compromising lateral door function, that is, the occupant is still able to apply needed force to the pull cup 24 as is required to close the door.

The armrest skin or cover 28 fits over the armrest substrate structure 26 in a known manner. The cover 28 has a cavity 44 defined therein which substantially mates with the pull cup-receiving aperture 40 of the armrest substrate structure 26. According to this arrangement, once the pull cup 24, the armrest substrate structure 26, and the cover 28 are assembled, these separate components appear to be integrated despite the fact that the pull cup 24 is not positively attached to either of these components. Thus the arrangement of the present invention does not compromise the appearance of the inner side of the vehicle door.

The pull cup 24 is attached to the metal armrest bracket 34. The metal armrest bracket is itself anchored to an inner panel 46 as shown in FIGS. 4 and 6. The inner panel 46 is disposed substantially within a door substrate 48 shown in FIG. 5 and as is known in the art. The metal armrest bracket 34 includes a pair of spaced apart hooks 50, 50'. The inner panel 46 has a pair of spaced apart hook-receiving slots 52, 52' defined therein. On attachment of the metal armrest bracket 34 to the inner panel 46, the hooks 50, 50' are hooked onto the inner panel 46 via the hook-receiving slots 52, 52' as is illustrated in FIG. 6. Attachment of the pull cup 24 to the inner panel 46 is fixedly made by a pair of fasteners in the form of threaded studs 54, 54' which are fitted through opposed flanges which extend laterally from the pull cup 24 and are twist locked or otherwise fastened to the inner panel 46. The bolster 32 is captured in part between the pull cup 24 and the inner panel 46. While threaded studs 54, 54' are illustrated, it is to be understood that other means of mechanical attachment such as screws and the like are usable for permanent anchoring of the pull cup to the inner panel 46.

As an alternative to the metal armrest bracket 34, an L-shaped metal bracket 56 may be used to securely and solidly attach the pull cup 24 to the inner panel 46. The L-shaped metal bracket 56 may be used singularly such that one arm of the bracket is attached to the underside of the pull cup 24 and the other arm is attached to the inner panel 46. In addition or as a further alternative, two spaced apart and opposed L-shaped metal brackets 56 (not shown) may be used whereby one arm of each bracket is attached to opposite side walls of the pull cup 24 and the other arm of each bracket is fixed to the inner panel 46.

On assembly, the pull cup 24 is positioned against the bolster 32 by inserting the alignment tabs 38, 38' in their respective slots on the bolster 32. The pull cup 24 is next mechanically fastened to the inner panel 46 using the threaded studs 54, 54' described above. Once the pull cup 24 is positively attached to the inner panel 46, the armrest substrate structure 26 is next positively attached to the inner panel 46 by fasteners (not shown) as is known in the art. As to the assembled relationship between the pull cup 24 and the armrest substrate structure 26, the assembler need only be concerned with confirming that the alignment tabs 36, 36' are properly aligned with the slots 42, 42'. Once the armrest substrate structure 26 is attached to the inner panel 46, the cover 28 is next fitted thereover in a known manner.

In addition to providing an arrangement whereby force is transferred directly from the armrest substrate structure 26 to the door inner panel 46 while bypassing the pull cup 24, the arrangement of the present invention provides reduced resistance to forces applied against the armrest cover 28 and the armrest substrate structure 26 in at least two ways. First, the provision of the slots 41, 41' formed in the armrest substrate structure 26 allow this structure to more readily collapse on impact than previously known in the art. (It is to be understood that the shape, placement and number of slots 41, 41' may be altered to achieve maximum collapsibility while maintaining a high degree of integrity.) Second, the door assembly 20 (shown in FIG. 2 and discussed in conjunction therewith) incorporates at least two additional cushioning features. The first is the presence of the door panel bolster 32 (which is padded as is known in the art) which acts as a spring to absorb some of the force applied against the armrest cover 28 and the armrest substrate structure 26. The second is the presence of the door inner panel 46 which, because of the relatively large span of material and the inherent springing quality of the sheet metal from which it is composed, also acts as a spring to absorb some of the applied force, and thus the entire door inner panel 46 offers a degree of flexibility.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for use in a vehicle, the door assembly comprising:
   an inner panel;
   a pull cup attached to said inner panel, said pull cup being attached to said inner panel by means of a primary connection;
   an armrest substrate structure attached to said inner panel, said pull cup being attached to said armrest substrate structure by a secondary connection, whereby in the event of an impact against the door assembly of the vehicle the movement of said armrest substrate would not result in movement of said pull cup by said armrest substrate.

2. The door assembly of claim 1, wherein said primary connection is made by a metal fastener.

3. The door assembly of claim 2, wherein said pull cup includes a pair of opposed flanges outwardly extending therefrom, each flange of said pair of opposed flanges having a metal fastener-passing aperture formed therein through which a metal fastener is passed to attach said pull cup to said inner panel.

4. The door assembly of claim 1, wherein said secondary connection is made by a plastic fastener.

5. The door assembly of claim 4, wherein said armrest substrate structure includes an alignment slot formed therein and said plastic fastener comprises an alignment tab extending from said pull cup, said alignment tab being insertable into said alignment slot of said armrest substrate structure.

6. The door assembly of claim 1 wherein said inner panel includes at least one hook-receiving slot formed therein and said pull cup further comprises at least one outwardly extending locking hook for locking engagement with said hook-receiving slot of said inner panel.

7. The door assembly of claim 1 wherein said armrest substrate structure includes an opening for receiving at least part of said pull cup, said armrest substrate structure further including a slot adjacent said opening.

8. The door assembly of claim 7 wherein said slot is an elongated slot.

9. A door assembly for use in a vehicle, the door assembly comprising:
   an inner panel;
   a pull cup attached to said inner panel; and
   an armrest substrate structure attached to said inner panel;
   said pull cup being attached to the door assembly by a fastening arrangement consisting of at least one mechanical fastener connecting said pull cup to said inner panel, whereby in the event of an impact against the door assembly of the vehicle the movement of said armrest substrate would not result in movement of said pull cup by said armrest substrate.

10. The door assembly of claim 9, wherein said mechanical fastener is a metal fastener.

11. The door assembly of claim 10, wherein said pull cup includes a pair of opposed flanges outwardly extending therefrom, each flange of said pair of opposed flanges having a metal fastener-passing aperture formed therein through which said metal fastener is passed to attach said pull cup to said inner panel.

12. The door assembly of claim 9, including an alignment system that aligns said pull cup with respect to said armrest substrate structure for ease of assembly.

13. The door assembly of claim 12, wherein said alignment system comprises an alignment tab extending from said pull cup and an alignment tab-receiving slot formed in said armrest substrate structure.

14. The door assembly of claim 9 wherein said inner panel includes at least one hook-receiving slot formed therein and said pull cup further comprises at least one outwardly extending locking hook for locking engagement with said hook-receiving slot of said inner panel.

15. The door assembly of claim 9 wherein said armrest substrate structure includes an opening for receiving at least part of said pull cup, said armrest substrate structure further including a slot adjacent said opening.

* * * * *